(12) United States Patent
Bayer et al.

(10) Patent No.: US 11,331,996 B2
(45) Date of Patent: May 17, 2022

(54) CONSTRUCTION OF A TRANSMISSION FOR A HYBRID VEHICLE, DRIVE TRAIN AND HYBRID VEHICLE

(71) Applicant: ZF Friedrichshafen AG, Friedrichshafen (DE)

(72) Inventors: Oliver Bayer, Lindau (DE); Martin Brehmer, Tettnang (DE); Leschek Debernitz, Eriskirch (DE); Christian Michel, Ravensburg (DE); Fabian Kutter, Kressbronn (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 305 days.

(21) Appl. No.: 16/483,959

(22) PCT Filed: Jan. 31, 2018

(86) PCT No.: PCT/EP2018/052339
§ 371 (c)(1),
(2) Date: Aug. 6, 2019

(87) PCT Pub. No.: WO2018/145967
PCT Pub. Date: Aug. 16, 2018

(65) Prior Publication Data
US 2020/0001697 A1    Jan. 2, 2020

(30) Foreign Application Priority Data

Feb. 7, 2017  (DE) .................... 10 2017 201 894.1

(51) Int. Cl.
*B60K 6/365*  (2007.10)
*B60K 6/40*  (2007.10)
(Continued)

(52) U.S. Cl.
CPC ............. *B60K 6/365* (2013.01); *B60K 6/40* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| | | | |
|---|---|---|---|
| 5,875,691 | A | 3/1999 | Hata et al. |
| 7,322,897 | B2 | 1/2008 | Yamauchi et al. |

(Continued)

FOREIGN PATENT DOCUMENTS

| | | |
|---|---|---|
| CN | 101678753 A | 3/2010 |
| DE | 102007010370 A1 | 9/2008 |

(Continued)

OTHER PUBLICATIONS

German Search Report DE102017201894.1, dated Aug. 29, 2017. (12 pages).

(Continued)

*Primary Examiner* — Dirk Wright
(74) *Attorney, Agent, or Firm* — Dority & Manning, P.A.

(57) ABSTRACT

A transmission has an input shaft, an output shaft coaxial to the input shaft, an intermediate shaft, a differential gear, and only one electric machine for driving a hybrid vehicle. The rotational axes of the input shaft, the intermediate shaft, the differential gear, and a rotor of the electric machine are axially parallel. The differential gear includes torque-transmitting interfaces to drive shafts connected to driving wheels of the hybrid vehicle. Torque is transmitted between the output shaft and the differential gear via the intermediate shaft. The rotor is permanently connected, via a constant gear ratio, to either the input shaft or a further shaft of the (Continued)

transmission. The rotational axis of the intermediate shaft is arranged spatially below a connection line between the rotational axes of the input shaft and the differential gear, and the rotational axis of the rotor is arranged spatially above the connection line.

7 Claims, 8 Drawing Sheets

(51) Int. Cl.
  *B60K 6/48* (2007.10)
  *B60K 6/547* (2007.10)
  *F16H 3/093* (2006.01)

(52) U.S. Cl.
  CPC ...... *B60K 2006/4833* (2013.01); *F16H 3/093* (2013.01); *F16H 2200/0043* (2013.01)

(56) References Cited

U.S. PATENT DOCUMENTS

| | | | |
|---|---|---|---|
| 7,395,735 B2* | 7/2008 | Enstrom | B60L 50/16 |
| | | | 74/661 |
| 7,975,571 B2 | 7/2011 | Sanji | |
| 8,708,070 B2* | 4/2014 | Tsuchida | B60K 6/405 |
| | | | 180/65.22 |
| 8,870,697 B2* | 10/2014 | Sada | B60K 6/40 |
| | | | 475/149 |
| 9,764,630 B2 | 9/2017 | Kaltenbach et al. | |
| 10,081,239 B2* | 9/2018 | Janson | B60K 6/445 |
| 10,308,104 B2* | 6/2019 | Oh | B60K 6/445 |
| 2005/0101425 A1 | 5/2005 | Yamauchi et al. | |
| 2007/0187160 A1 | 8/2007 | Raoul | |
| 2009/0023529 A1* | 1/2009 | Sanji | H02K 7/006 |
| | | | 475/5 |
| 2009/0105040 A1 | 4/2009 | Sanji | |
| 2010/0120569 A1* | 5/2010 | Sanji | B60K 6/365 |
| | | | 475/5 |
| 2014/0246935 A1 | 9/2014 | Kasuya et al. | |

FOREIGN PATENT DOCUMENTS

| | | | | |
|---|---|---|---|---|
| DE | 112008001374 T5 | 4/2010 | | |
| DE | 112012003406 T5 | 5/2014 | | |
| DE | 102013215114 A1 | 2/2015 | | |
| EP | 0776779 A2 | 6/1997 | | |
| EP | 1440833 A2 | 7/2004 | | |
| FR | 2869571 A1 | 11/2005 | | |
| JP | 2009286188 A | * | 12/2009 | |
| JP | 2009286188 A2 | 12/2009 | | |
| JP | 2012035680 A | * | 2/2012 | |
| JP | 2012035680 A2 | 2/2012 | | |
| JP | 2015101278 A | * | 6/2015 | ............ F16H 3/727 |
| WO | WO 2012/117501 A1 | 9/2012 | | |

OTHER PUBLICATIONS

International Search Report PCT/EP2018/052339, dated Apr. 4, 2018. (2 pages).

* cited by examiner

CONSTRUCTION OF A TRANSMISSION FOR A HYBRID VEHICLE, DRIVE TRAIN AND HYBRID VEHICLE

FIELD OF THE INVENTION

The invention relates generally to the configuration of a transmission for a hybrid vehicle having a drive train aligned transversely to the direction of travel of the hybrid vehicle. The invention further relates generally to a drive train and to a hybrid vehicle having a transmission, which has such a configuration.

BACKGROUND

Patent application DE 10 2013 215 114 A1 of the applicant describes a hybrid drive for a motor vehicle, which is aligned transversely to the direction of travel of the motor vehicle. An internal combustion engine is connected via a clutch to the input shaft of an automated transmission, the output shaft of which drives the crown wheel of an axle differential. An electric machine is arranged axially parallel to the input shaft, the output shaft, and the axle differential, and is connected via two gearwheels to the ring gear of a planetary transmission, which is arranged coaxially to the output shaft. A specific spatial arrangement of the components is not disclosed.

Publication DE 11 2008 001 374 T5 describes a hybrid drive device having an input shaft, which is connected to an internal combustion engine, an electric machine arranged axially parallel to the internal combustion engine, and a transmission arranged coaxially to the input shaft, the output shaft of which drives a differential gear via a countershaft. The electric machine is connected via a reduction mechanism to the transmission input shaft, which is connected via a clutch to the input shaft. The axis of rotation of the countershaft is situated spatially above a connection line between the axis of rotation of the input shaft and the axis of rotation of the differential gear. The electric machine is arranged spatially directly above the input shaft. Such an arrangement results in a requirement for an undesirably large amount of installation space, since the electric machine is situated entirely above the remaining components.

Publication WO 2012/117501 A1 discloses a CVT transmission for a hybrid drive train. An input-side friction wheel is arranged coaxially to the output shaft of the internal combustion engine, and an output-side friction wheel is arranged axially parallel thereto. An electric motor is arranged axially parallel to the friction wheels and acts on the input-side friction wheel via a countershaft. A differential device is arranged axially parallel to the friction wheels and to the electric motor, wherein the output-side friction wheel is directly operatively connected to the differential device via a tooth system. The electric motor is arranged spatially above the differential device and overlaps the two friction wheels. Such an arrangement also requires a large amount of installation space, since the gear ratio-forming friction wheels are necessarily arranged on two axles. The electric motor is arranged, to a greater extent, above the remaining components.

Patent application EP 1 440 833 A2 describes a transmission for a hybrid drive, which has a first motor-generator and a second motor-generator, which interact with a total of four shafts via a planetary transmission. As a result, the gear ratio between an input element and an output element of the transmission is infinitely variable. The output element is connected to a differential via an intermediate shaft. The axis of rotation of one of the motor-generators is arranged spatially above the axis of rotation of the input element. The axis of rotation of the intermediate shaft is arranged spatially below the axes of rotation of the input element and of the differential. Due to the two motor-generators overall, a large amount of installation space is necessary for such a transmission.

The problem addressed by the invention is therefore that of providing a configuration for a transmission, which is distinguished by a low installation space requirement.

SUMMARY OF THE INVENTION

The invention relates to a configuration of a transmission for a hybrid vehicle having a drive train aligned transversely to the direction of travel of the hybrid vehicle, i.e., having a so-called front-transverse arrangement or a rear-transverse arrangement. The transmission has an input shaft, an intermediate shaft, a differential gear, and precisely one electric machine configured for driving the hybrid vehicle, the electric machine encompassing a rotationally fixed stator and a rotary rotor. The input shaft, the intermediate shaft, the differential gear, and the rotor have axes of rotation arranged axially parallel to one another.

The input shaft forms a torque-transmitting interface to an internal combustion engine of the hybrid vehicle. Alternatively, the input shaft is connected to such an interface via a clutch or a freewheel unit. The differential gear includes torque-transmitting interfaces to drive shafts of the hybrid vehicle. The drive shafts are connected to driving wheels of the hybrid vehicle.

The transmission is configured for making different gear ratios available between the input shaft and an output shaft arranged coaxially to the input shaft. This type of transmission is formed, for example, with the aid of planetary gear sets and shift elements cooperating with the planetary gear sets. The torque applied to the output shaft is transmitted via the intermediate shaft to the differential gear.

The rotor of the electric machine is permanently connected either to the input shaft or to a further shaft of the transmission, which contributes to the formation of the gear ratio between the input shaft and the output shaft. The permanent connection takes place via a constant gear ratio, for example, via a single-stage or multi-stage spur gear drive or via a chain drive.

According to the invention, the axis of rotation of the intermediate shaft is arranged spatially below a connection line between the axis of rotation of the input shaft and the axis of rotation of the differential gear. The axis of rotation of the rotor is arranged spatially above this connection line. The geometric descriptions "spatially below" and "spatially above" relate to the installation position of the transmission in the hybrid vehicle. Such an arrangement results in a particularly complex configuration, since the formation of the different gear ratios takes place in a coaxial system, and only one electric machine is present for driving the vehicle. In this case, which differs from that which is otherwise typical, the intermediate shaft is arranged spatially below the connection line, whereby the electric machine may take up the installation space otherwise utilized by the intermediate shaft.

Viewed in the axial direction, a connection of the axes of rotation of the input shaft, the intermediate shaft, and the differential gear form a triangle. Preferably, the electric machine is associated with the side of this triangle that does not contact the intermediate shaft. As a result, a particularly compact configuration of the transmission is possible.

Preferably, a distance between the axis of rotation of the rotor and the axis of rotation of the differential gear in the direction of travel of the hybrid vehicle is less, in particular considerably less, than a distance between the axis of rotation of the input shaft and the axis of rotation of the rotor in the direction of travel.

According to a preferred embodiment, the different gear ratios between the input shaft and the output shaft are formable with the aid of multiple planetary gear sets and shift elements cooperating with the planetary gear sets.

Preferably, a transmission having the above-described configuration is a component of a hybrid vehicle or of a drive train for such a hybrid vehicle, which has the transmission as well as an internal combustion engine.

BRIEF DESCRIPTION OF THE DRAWINGS

Exemplary embodiments of the invention are described in detail in the following with reference to the attached figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
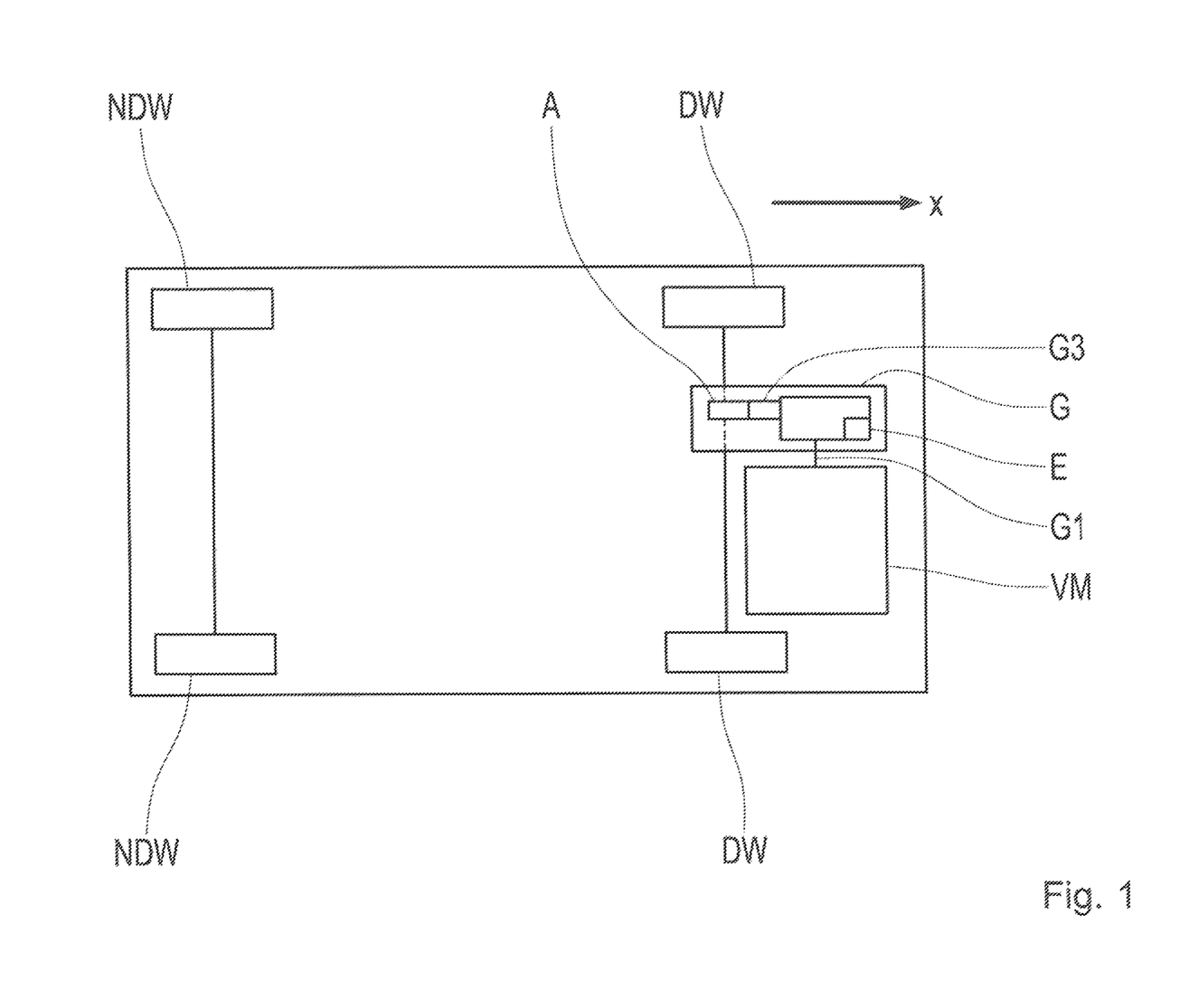
FIG. 1 shows a schematic view of a hybrid vehicle including a drive train aligned transversely to the direction of travel of the hybrid vehicle.

FIG. 1 shows a schematic view of a hybrid vehicle including a drive train aligned transversely to the direction of travel x. The drive train has two driven wheels DW and two non-driven wheels NDW. An internal combustion engine VM is connected to a transmission G via an input shaft G1 of the transmission G. The input shaft G1 therefore forms a torque-transmitting interface to the internal combustion engine VM. Moreover, the transmission G has an electric machine E, an intermediate shaft G3, and a differential gear A. The differential gear A includes two torque-transmitting interfaces to drive shafts connected to the driving wheels DW. The electric machine has a rotationally fixed stator S and a rotary rotor R.

Figure 2:
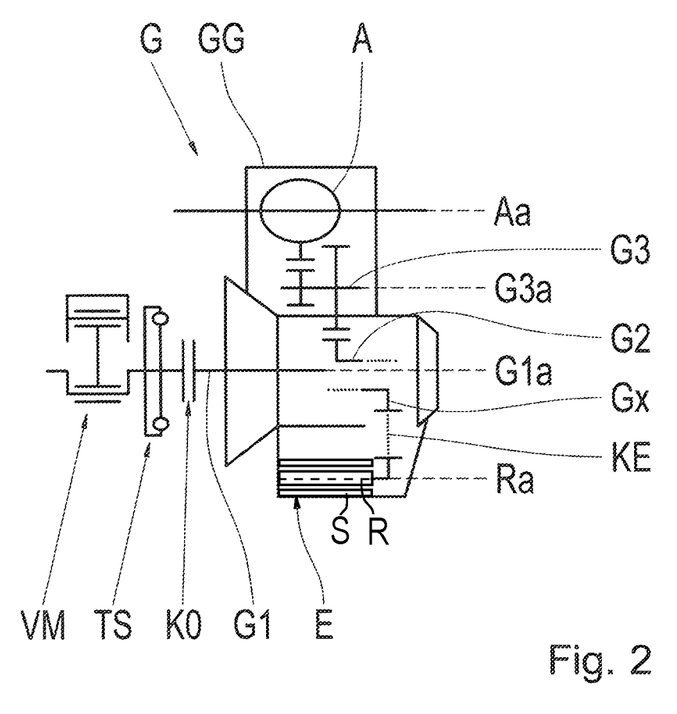
FIGS. 2-7 show schematic views of drive trains including a transmission for such a hybrid vehicle.

FIG. 2 shows a schematic view of the drive train for such a hybrid vehicle. The internal combustion engine VM is connected to the input shaft G1 of the transmission G via a torsional vibration damper TS and a clutch K0. This is to be considered merely as an example. The internal combustion engine VM could also be connected to the input shaft G1 without a clutch K0. Alternatively, the clutch K0 could be replaced by a freewheel unit. These types of variations are usable for all exemplary embodiments in question.

The input shaft G1 rotates about an axis of rotation G1$a$, which is coaxial to the crankshaft axis of the internal combustion engine VM. An output shaft G2 of the transmission G is arranged coaxially to the input shaft G1. In addition to the input shaft G1 and the output shaft G2, the transmission G has further shafts, which contribute to the formation of the gear ratio between the input shaft G1 and the output shaft G2, including a shaft Gx. The rotor R of the electric machine E is permanently connected to the shaft Gx via a chain drive KE. Due to the chain drive KE, there is a constant gear ratio between the rotor R and the shaft Gx. The electric machine E is arranged axially parallel to the input shaft G1, wherein the rotor R rotates about an axis of rotation R$a$.

The differential gear A is arranged axially parallel to the input shaft G1 and rotates about an axis of rotation A$a$. An intermediate shaft G3, which is arranged axially parallel to the differential gear A and the input shaft G1, is located in the power path between the output shaft G2 and the differential gear A. The intermediate shaft G3 rotates about an axis of rotation G3$a$.

Figure 3:
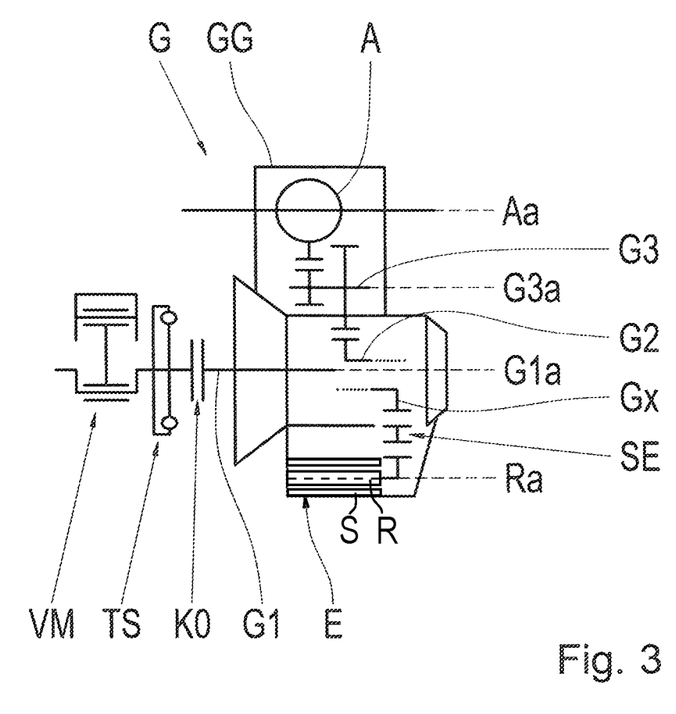

FIG. 3 shows a further schematic view of a drive train for a hybrid vehicle according to FIG. 1, which essentially corresponds to the drive train represented in FIG. 2 except that the rotor R of the electric machine E is not connected to the shaft Gx via a chain drive, but rather via a spur gear drive SE.

Figure 4:
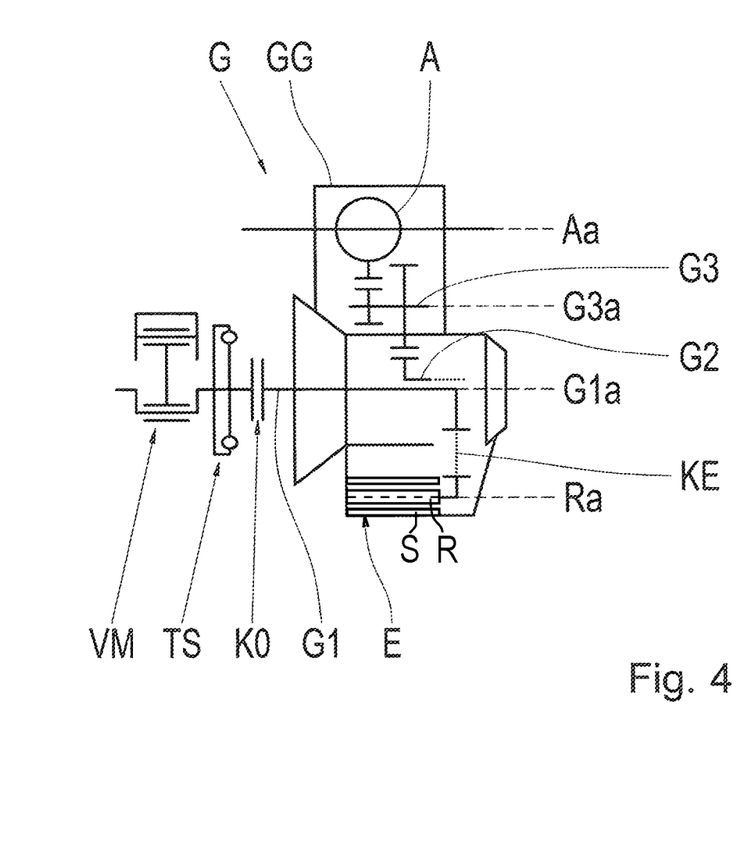

FIG. 4 shows a further schematic view of a drive train for a hybrid vehicle according to FIG. 1, which essentially corresponds to the drive train represented in FIG. 2 except that the rotor R of the electric machine E is no longer connected to the shaft Gx, but rather to the input shaft G1. The connection takes place via the chain drive KE. The chain drive KE is arranged on the axial end of the transmission G that points away from the internal combustion engine VM.

Figure 5:
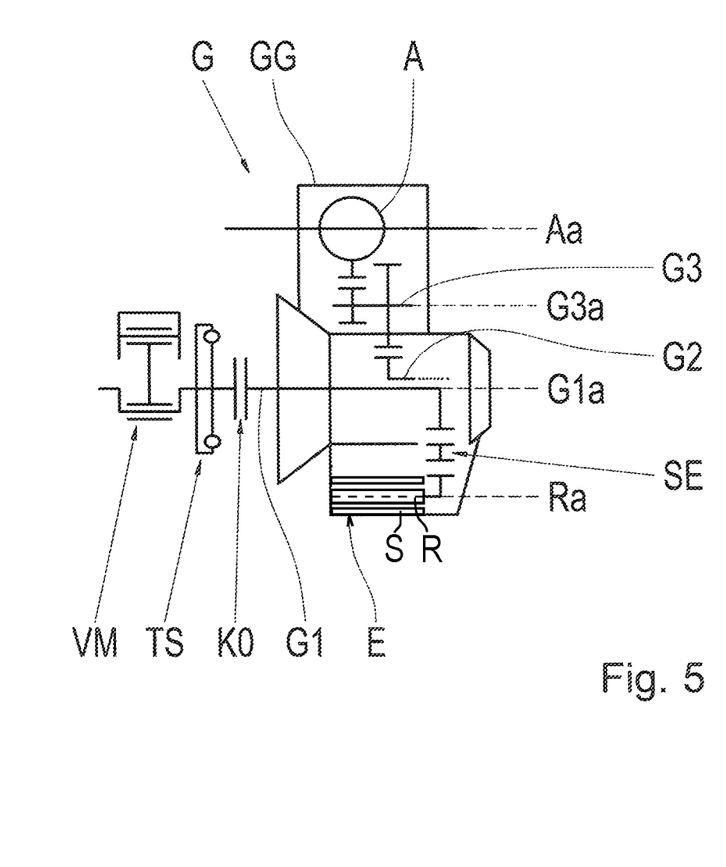

FIG. 5 shows a further schematic view of a drive train for a hybrid vehicle according to FIG. 1, which essentially corresponds to the drive train represented in FIG. 4 except that the rotor R of the electric machine E is not connected to the input shaft G1 via a chain drive, but rather via a spur gear drive SE.

Figure 6:
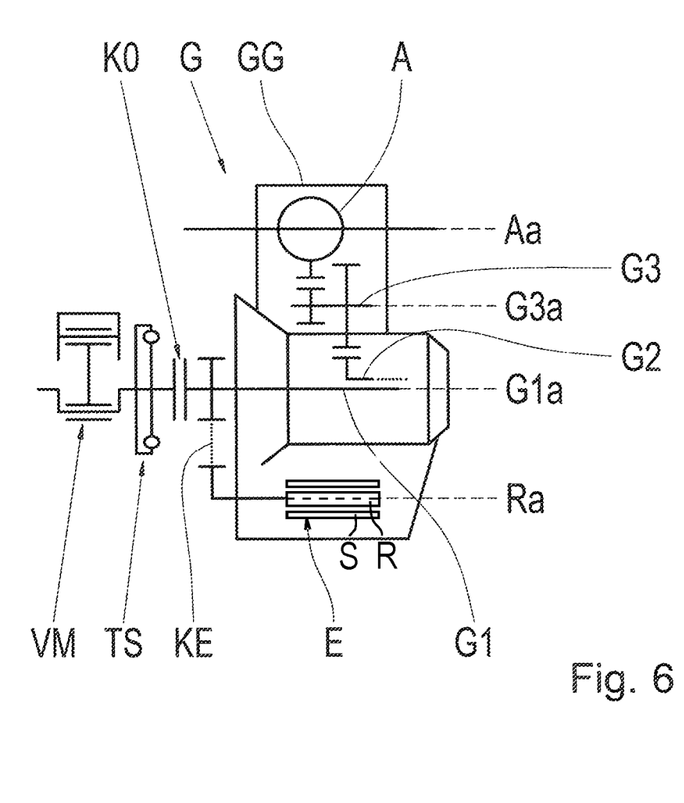

FIG. 6 shows a further schematic view of a drive train for a hybrid vehicle according to FIG. 1, which essentially corresponds to the drive train represented in FIG. 4 except that the chain drive KE is arranged on the axial end of the transmission G that points toward the internal combustion engine VM. The chain drive KE could also be arranged within the housing GG of the transmission G.

Figure 7:
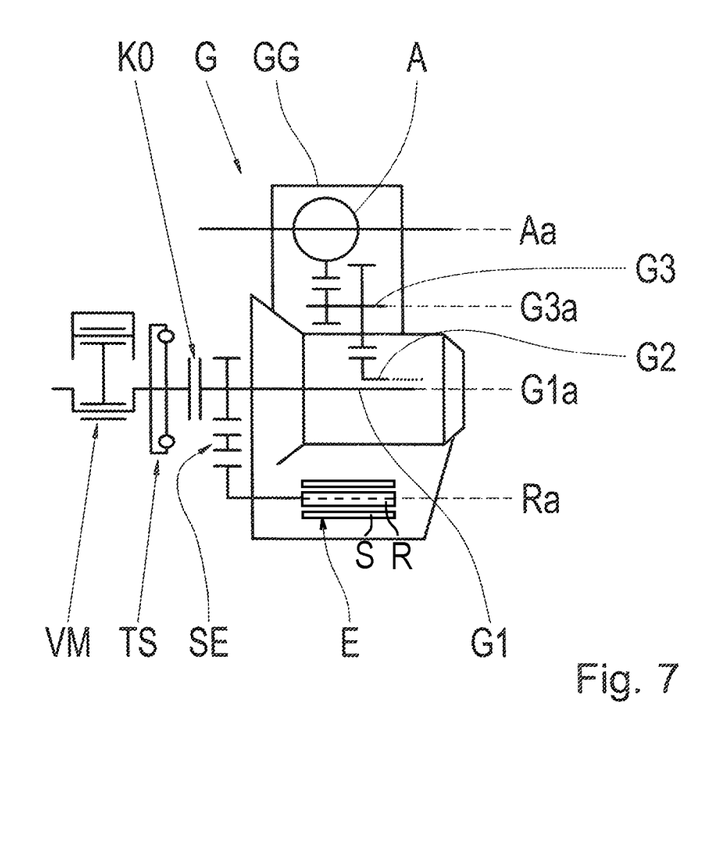

FIG. 7 shows a further schematic view of a drive train for a hybrid vehicle according to FIG. 1, which essentially corresponds to the drive train represented in FIG. 6 except that the rotor R of the electric machine E is not connected to the input shaft G1 via a chain drive, but rather via a spur gear drive SE. The spur gear drive SE could also be arranged within the housing GG of the transmission G.

Figure 8:
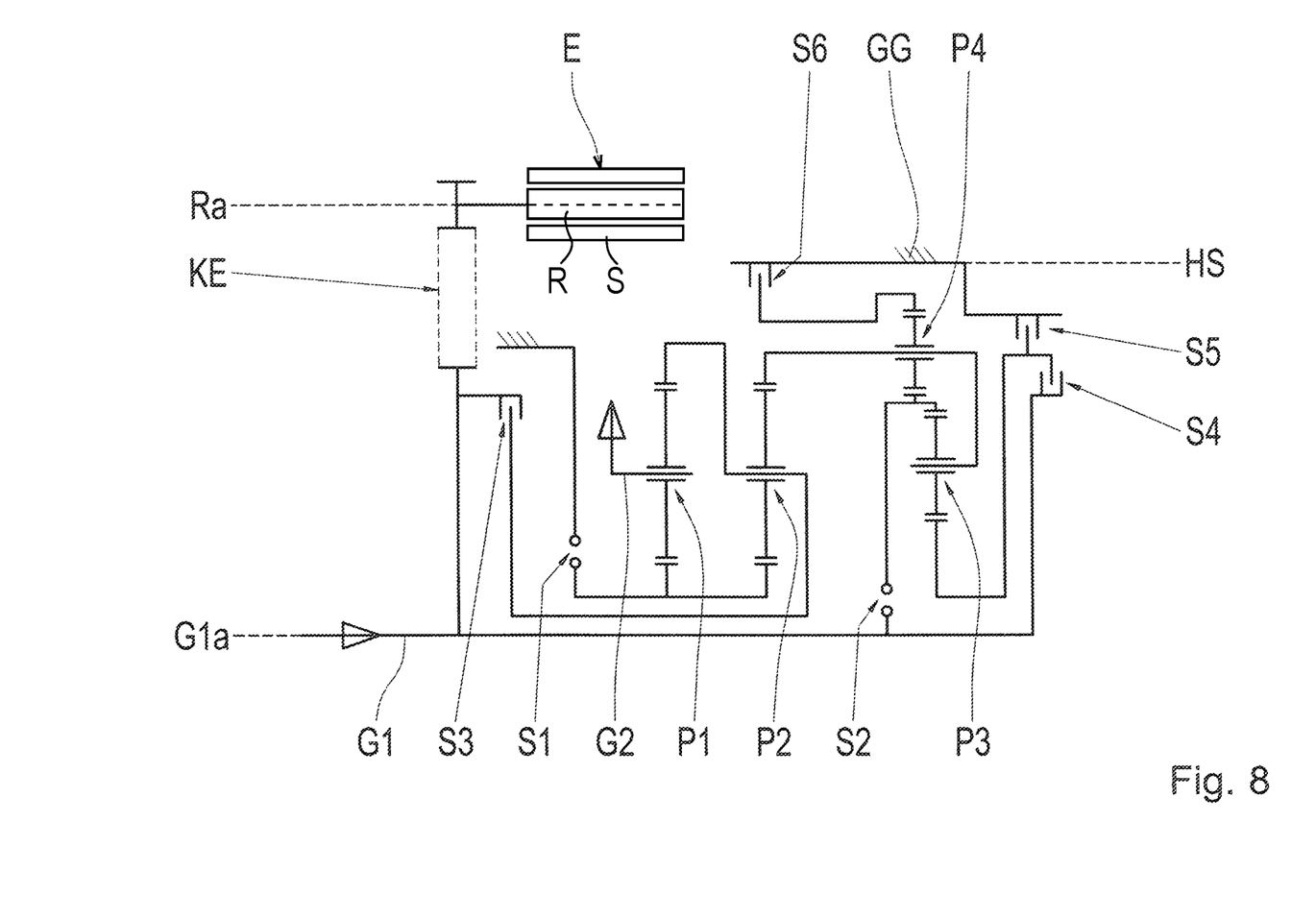
FIG. 8 shows a schematic view of an exemplary transmission for these types of drive trains.

FIG. 8 shows a schematic view of a gear set of the transmission G for the above-described drive trains. The transmission G has four planetary gear sets P1, P2, P3, P4 and six shift elements S1, S2, S3, S4, S5, S6. Due to the selective engagement of three of the shift elements in each case, nine forward gears and one reverse gear can be made available between the input shaft G1 and the output shaft G2 with the aid of the represented linkage of the individual planetary gear set elements. The configuration of the gear set is to be considered merely as an example. The formation of different gear ratios is also possible with the aid of other gear set schemes.

In FIG. 8, only one section half of the gear set is represented. This reduced representation is provided for the sake of greater clarity. The representation selected in FIG. 8 having the electric machine E and the gear set corresponds to an unrolled sectioning in order to emphasize the radial distance between elements of the gear set and of the electric machine E. For this purpose, FIG. 8 shows the connection of the electric machine E to the input shaft G1 via the chain drive KE. The chain drive KE could be replaced by the spur gear drive SE; this is not represented, for the sake of brevity.

Figure 9:
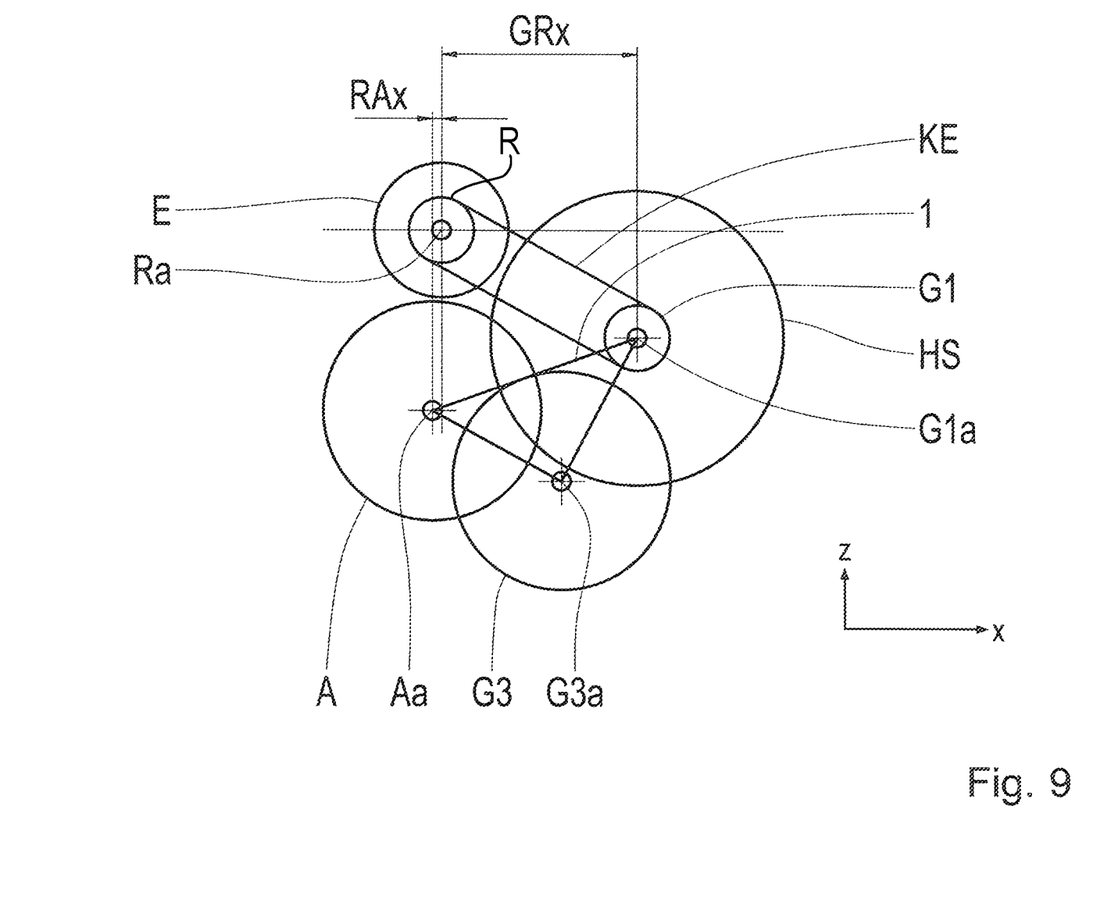
FIG. 9 shows a view for positioning an input shaft, an intermediate shaft, a differential gear, and ab electric machine for this type of transmission.

FIG. 9 shows a view of the positioning of the input shaft G1, the intermediate shaft G3, the differential gear A, and the electric machine E of the transmission G. The view corresponds to a plane, which results through the direction of travel x and the vertical axis z of the hybrid vehicle. The connection of the electric machine E to the input shaft G1 takes place via the chain drive KE. The reference character HS marks an outer envelope HS of the gear set arranged coxially to the input shaft G1. It is clearly apparent from FIG. 9 that the axis of rotation Ra of the rotor R is arranged spatially above a connection line 1 between the axis of rotation G1a of the input shaft G1 and the axis of rotation Aa of the differential gear A. The axis of rotation G3a of the intermediate shaft G3 is arranged spatially below the connection line 1. The axes of rotation G1a, G3a and Aa form a triangle in the plane, wherein the connection line 1 forms the longest side of this triangle. This side of the triangle faces the electric machine E. A distance RAx between the axis of rotation Aa of the differential gear A and the axis of rotation Ra of the rotor R in the direction of travel x is considerably less than a distance GRx between the axis of rotation G1a and the axis of rotation Ra in the direction of travel x. In other words, the electric machine is arranged considerably closer, in the direction of travel x, to the differential gear A than to the input shaft G1.

Figure 10:
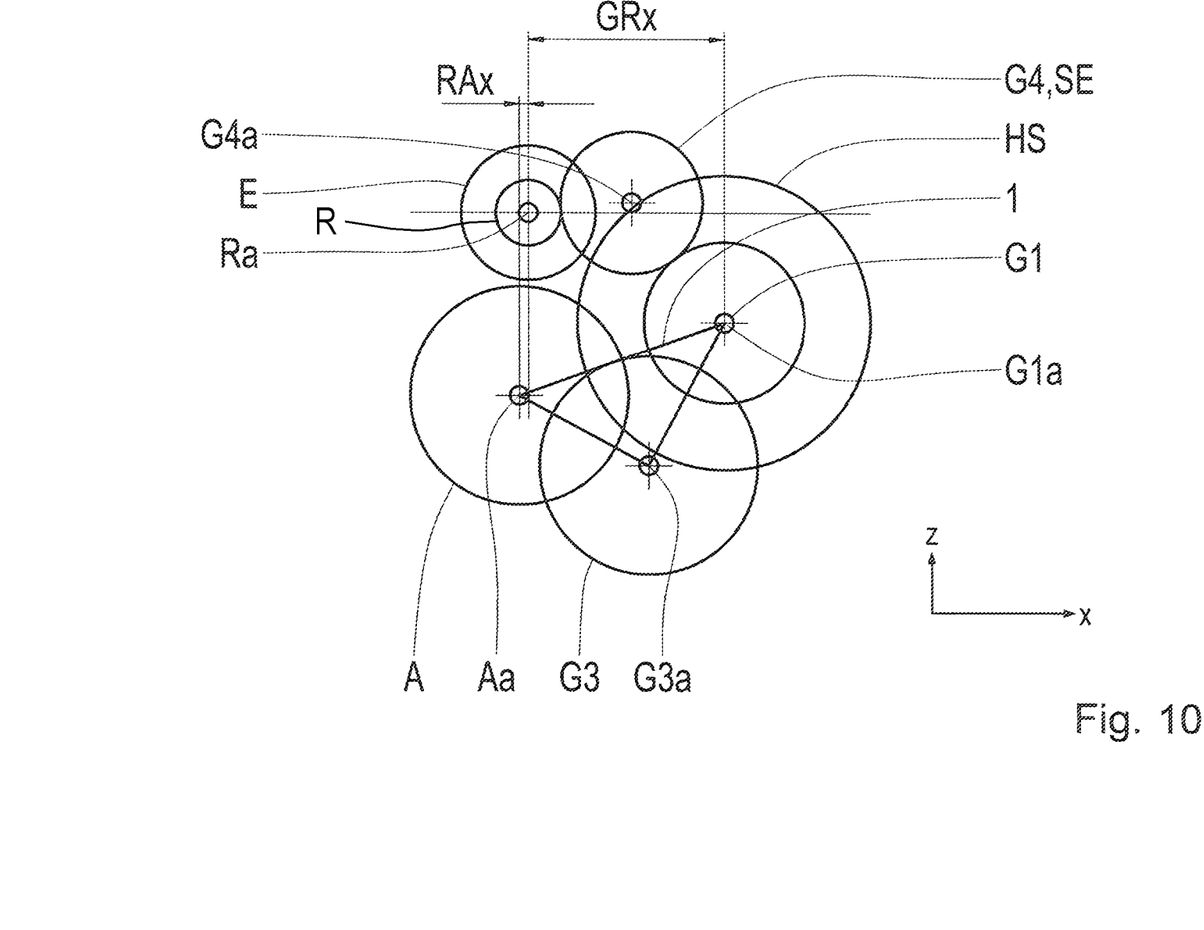
FIG. 10 shows another view for positioning of an input shaft, an intermediate shaft, a differential gear, and an electric machine for this type of transmission.

FIG. 10 shows a view of another positioning of the input shaft G1, the intermediate shaft G3, the differential gear A, and the electric machine E of the transmission G, which essentially corresponds to the representation in FIG. 9 except that, instead of the chain drive connection between the electric machine E and the input shaft G1, the connection takes place via a spur gear drive SE, which has a further intermediate shaft G4. The intermediate shaft G4 rotates about an axis of rotation G4a, which is arranged axially parallel to the axis of rotation Ra and to the axis of rotation G1a.

Figure 11:
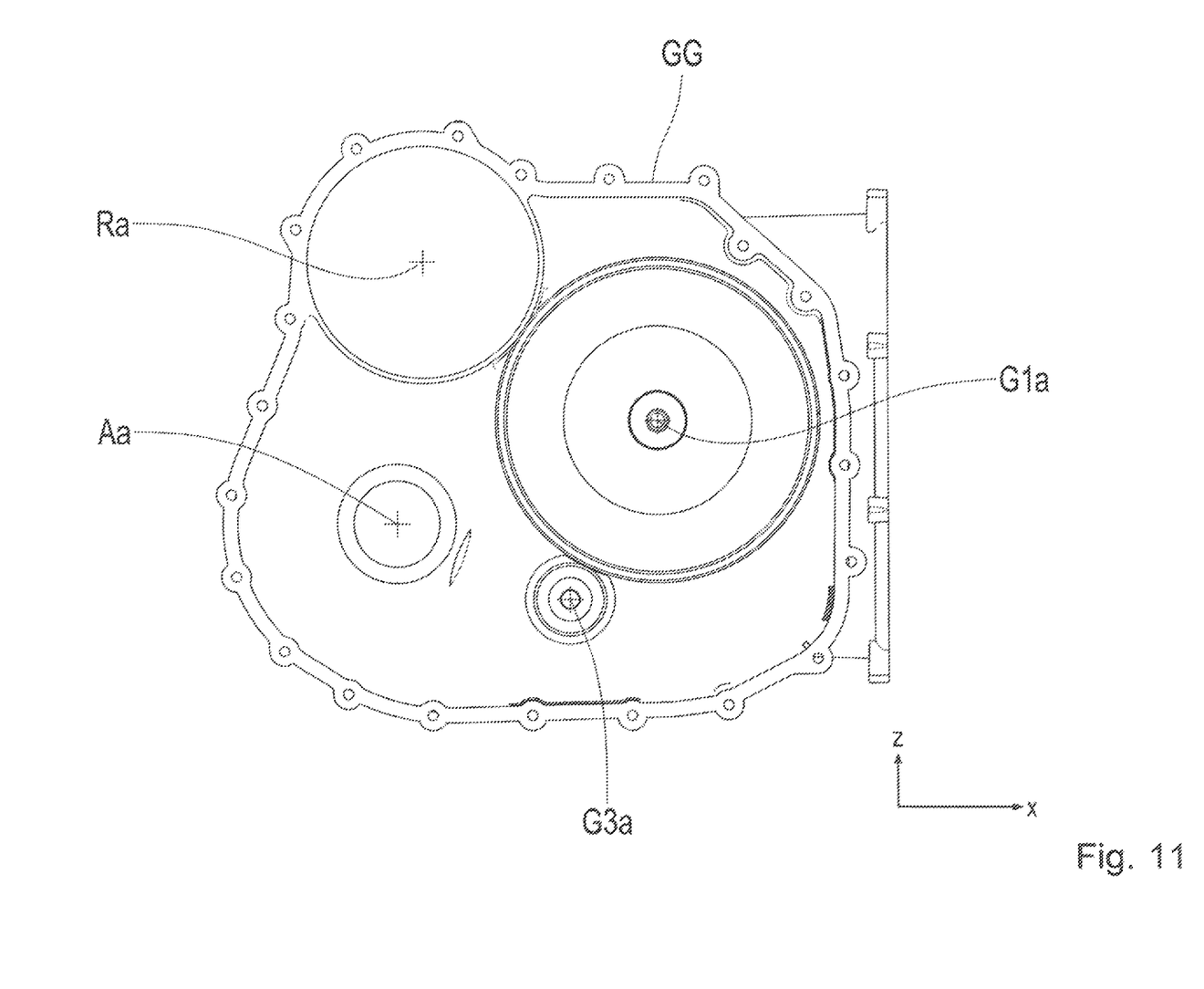
FIG. 11 shows an exemplary side view of a housing for such a transmission.

FIG. 11 shows a side view of the housing GG for such a transmission G. As in FIG. 9 and FIG. 10, the view lies in the plane through the direction of travel x and the vertical axis z of the hybrid vehicle. Therein, it is clearly apparent that the housing GG is configured to be particularly compact.

Modifications and variations can be made to the embodiments illustrated or described herein without departing from the scope and spirit of the invention as set forth in the appended claims.

REFERENCE CHARACTERS

G transmission
GG housing
G1 input shaft
G1a axis of rotation
G2 output shaft
P1-P4 planetary gear set
S1-S6 shift element
HS envelope
Gx further shaft
G3 intermediate shaft
G3a axis of rotation
A differential gear
Aa axis of rotation
E electric machine
R rotor
S stator
Ra axis of rotation
KE chain drive
SE spur gear drive
G4 further intermediate shaft
G4a axis of rotation
1 connection line
GRx distance
RAx distance
x direction of travel
z vertical axis
DW driving wheel
NDW non-driven wheel
VM internal combustion engine
TS torsional vibration damper
K0 clutch

The invention claimed is:

1. A configuration of a transmission (G) for a hybrid vehicle comprising a drive train aligned transversely to a direction of travel (x) of the hybrid vehicle, the transmission (G) comprising:
    an input shaft (G1) having an axis of rotation (G1a);
    an output shaft (G2) arranged coaxially to the input shaft (G1);
    an intermediate shaft (G3) having an axis of rotation (G3a);
    a differential gear (A) having an axis of rotation (Aa); and
    only one electric machine (E) configured for driving the hybrid vehicle, the electric machine (E) having a rotor (R) and a stator (S), the rotor (R) being rotatable about an axis of rotation (Ra),
    wherein the axes of rotation (G1a, G3a, Aa, Ra) of the input shaft (G1), the intermediate shaft (G3), the differential gear (A), and the rotor (R) of the electric machine (E) are aligned axially parallel to one another,
    wherein the input shaft (G1) forms a torque-transmitting interface (GV) to an internal combustion engine (VM) of the hybrid vehicle or is connected to such an interface via a clutch (K0) or via a freewheel unit,
    wherein the differential gear (A) includes torque-transmitting interfaces to drive shafts connected to driving wheels (DW) of the hybrid vehicle,
    wherein the transmission (G) is configured for making different gear ratios available between the input shaft (G1) and the output shaft (G2),
    wherein torque is transmitted between the output shaft (G2) and the differential gear (AG) via the intermediate shaft (G3),
    wherein the rotor (R) is permanently connected, via a constant gear ratio, either to the input shaft (G1) or to a further shaft (Gx) of the transmission (G), which contributes to the formation of the gear ratio of the transmission (G),
    wherein the axis of rotation (G3a) of the intermediate shaft (G3) is arranged below a connection line (1)

between the axis of rotation (G1a) of the input shaft (G1) and the axis of rotation (Aa) of the differential gear (A), and wherein the axis of rotation (Ra) of the rotor (R) is arranged above the connection line (1).

2. The configuration of the transmission (G) of claim 1, wherein corner points of a triangle lie on the axes of rotation (G1a, G3a, Aa) of the input shaft (G1), the intermediate shaft (G3), and the differential gear (A), a side of the triangle between the axis of rotation (G1a) of the input shaft (G1) and the axis of rotation (Aa) of the differential gear (A) is closest to the electric machine (E).

3. The configuration of the transmission (G) of claim 1, wherein a distance (RAx) between the axis of rotation (Ra) of the rotor (R) and the axis of rotation (Aa) of the differential gear (A) in the direction of travel (x) of the hybrid vehicle is less than a distance (GRx) between the axis of rotation (Ra) of the rotor (R) and the axis of rotation (G1a) of the input shaft (G1) in the direction of travel (x) of the hybrid vehicle.

4. The configuration of the transmission (G) of claim 1, wherein the different gear ratios between the input shaft (G1) and the output shaft (G2) are formable with a plurality of planetary gear sets (P1, P2, P3, P4) and a plurality of shift elements (S1, S2, S3, S4, S5, S6).

5. The configuration of the transmission (G) of claim 1, wherein the constant gear ratio between the rotor (R) and the input shaft (G1) or the further shaft (Gx) is determined by the gear ratio of a chain drive (KE) or a spur gear drive (SE).

6. A drive train for a hybrid vehicle comprising an internal combustion engine (VM) and the transmission (G) of claim 1.

7. A hybrid vehicle, comprising the transmission (G) of claim 1.

* * * * *